Oct. 26, 1943.    E. KREISSIG ET AL    2,332,859
SHAFT COUPLING
Filed Aug. 30, 1939    6 Sheets-Sheet 1

Inventors
Ernst Kreissig
Franz Tönne
Kurt Rosenbaum
By
Their Attorney

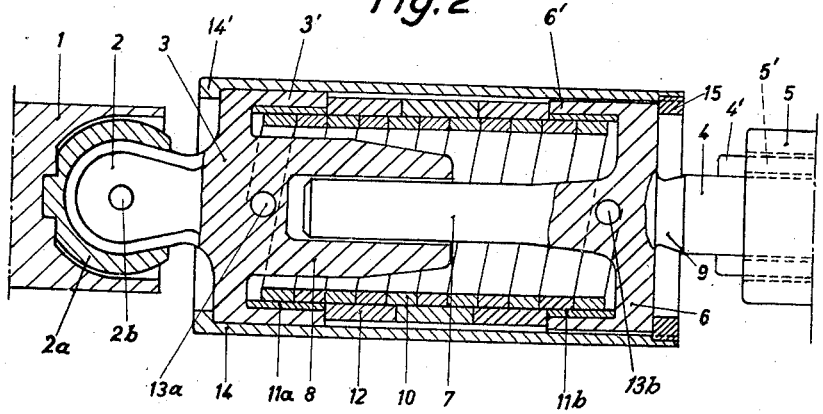
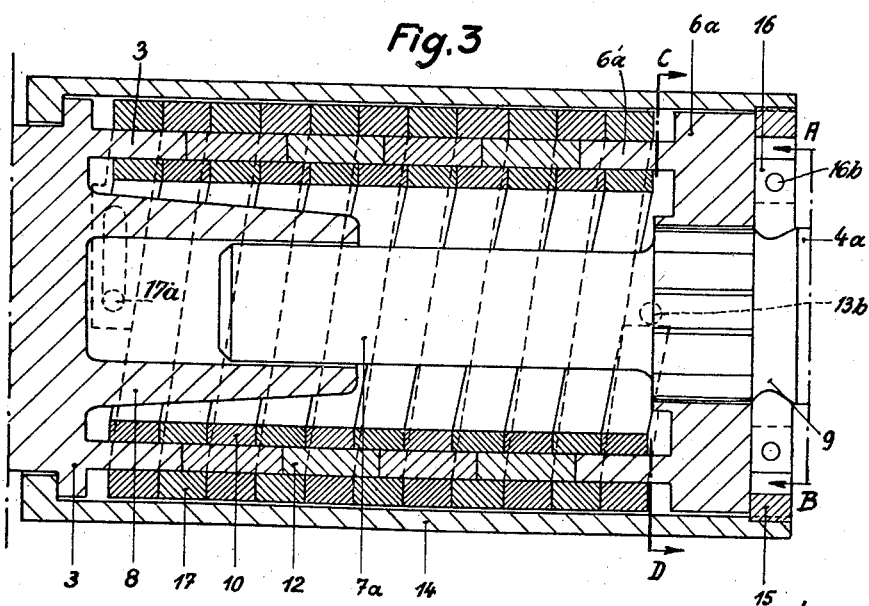

Oct. 26, 1943.  E. KREISSIG ET AL  2,332,859
SHAFT COUPLING
Filed Aug. 30, 1939  6 Sheets-Sheet 3
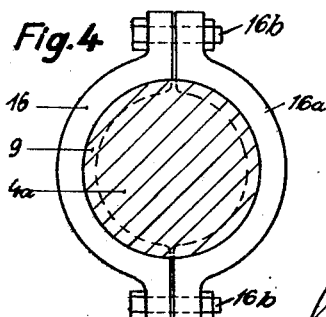
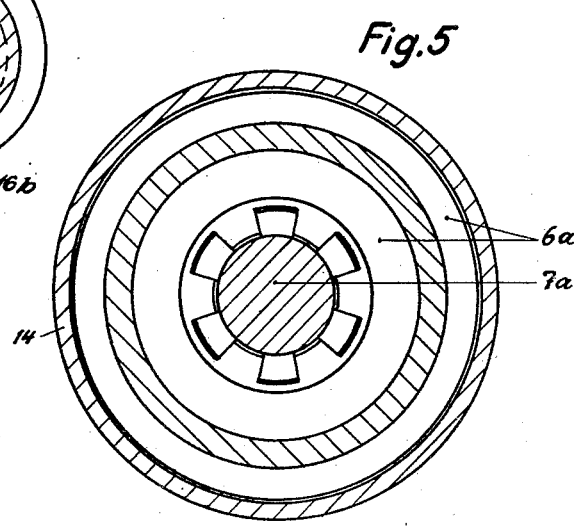
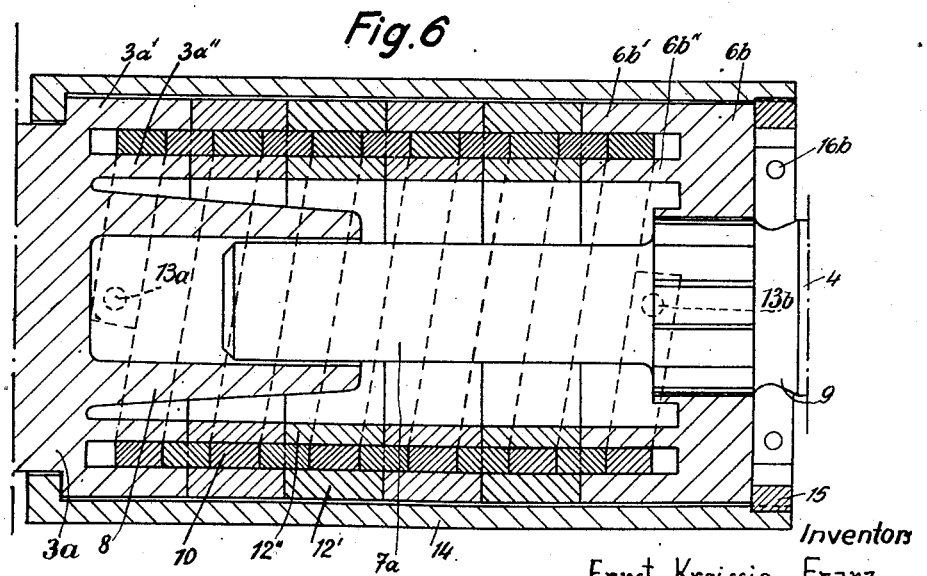
Inventors
Ernst Kreissig, Franz
Tönne, Kurt Rosenbaum
By
Their Attorney Inventors
Ernst Kreissig, Franz
Tönne, Kurt Rosenbaum
By
Their Attorney Oct. 26, 1943.   E. KREISSIG ET AL   2,332,859
SHAFT COUPLING
Filed Aug. 30, 1939   6 Sheets-Sheet 5

Inventors
Ernst Kreissig
Franz Tönne
By Kurt Rosenbaum
Their Attorney

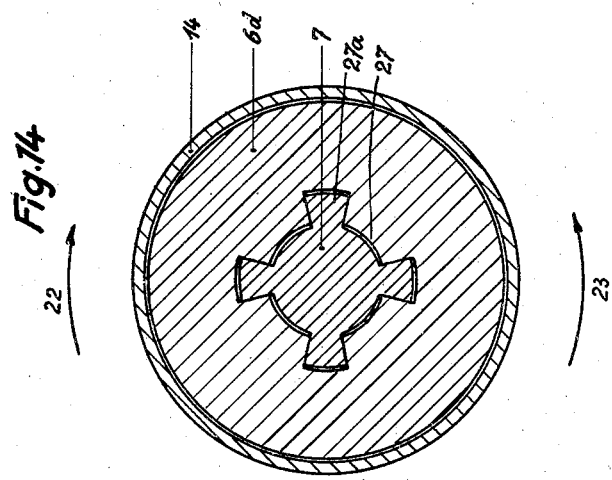
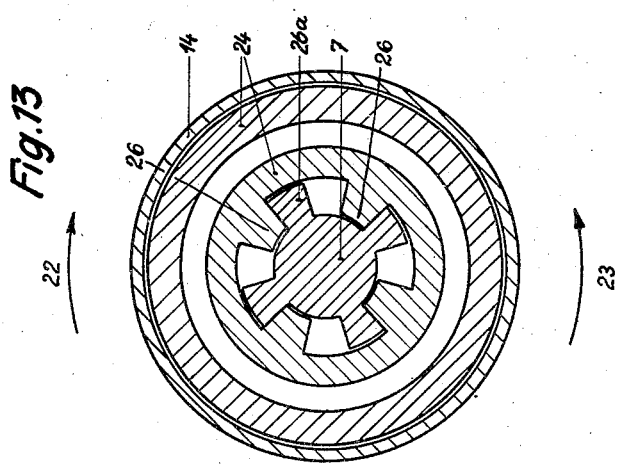
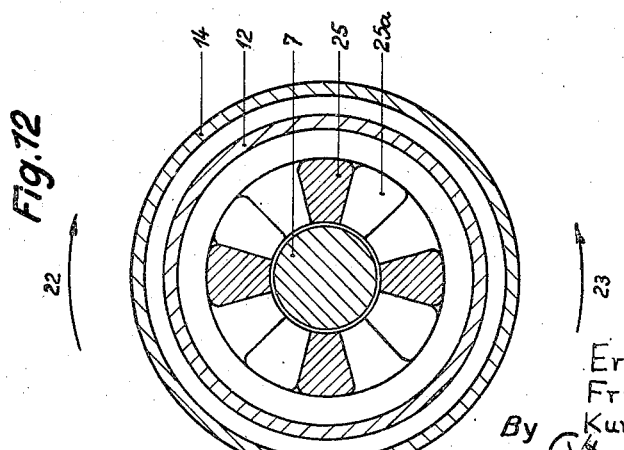

Patented Oct. 26, 1943

2,332,859

UNITED STATES PATENT OFFICE 2,332,859

SHAFT COUPLING

Ernst Kreissig and Franz Tönne, Krefeld-Uerdingen, and Kurt Rosenbaum, Rheinhausen-on-the-Rhine, Germany; vested in the Alien Property Custodian Application August 30, 1939, Serial No. 292,674
In Germany August 30, 1938

9 Claims. (Cl. 64—27)

This invention relates to a coupling arrangement for shafts and spindles and has particular reference to elastic spring couplings for roller mills.

It is an object of the present invention to provide the coupling or couplings at a point or points of the mill where optimum springing effect is secured.

Another object of the invention is to provide at such points couplings of a design and operating principle providing favourable stressing conditions for the spring material of the coupling.

With these and further objects in view, as may become apparent from the within disclosures, the invention consists not only in the structures herein pointed out and illustrated by the drawings, but includes further structures coming within the scope of what hereinafter may be claimed.

The character of the invention, however, may be best understood by reference to certain of its structural forms, as illustrated by the accompanying drawings in which—

Fig. 2 is an axial section of a coupling having the invention applied thereto and adapted for the transmission of torques in one direction of rotation only.

Figs. 3 to 14 show couplings adapted for operation in either direction of rotation, such as required, for instance, in reversing roller mills, viz.:

Fig. 3 is an axial section of an embodiment comprising one pressure spring and one tension spring.

Fig. 4 is a detail of Fig. 3, in a section on line A—B of Fig. 3.

Fig. 5 is a section on line C—D of Fig. 3.

Fig. 6 is an axial section of an embodiment comprising one helical spring only.

Fig. 7 is an axial section of a design comprising two pressure springs.

Figs. 8 and 9 are detail views, partly in section, illustrating the operation of the coupling pins of Fig. 7.

Fig. 10 is a section on line E—F of Fig. 7.

Fig. 11 is an axial section of a construction embodying two pressure springs arranged one behind the other.

Fig. 12 is a section on line G—H of Fig. 11.

Fig. 13 is a section on line J—K of Fig. 11.

Fig. 14 is a section on line L—M of Fig. 11.

Similar reference numerals denote similar parts in the different figures:

Figure 1:
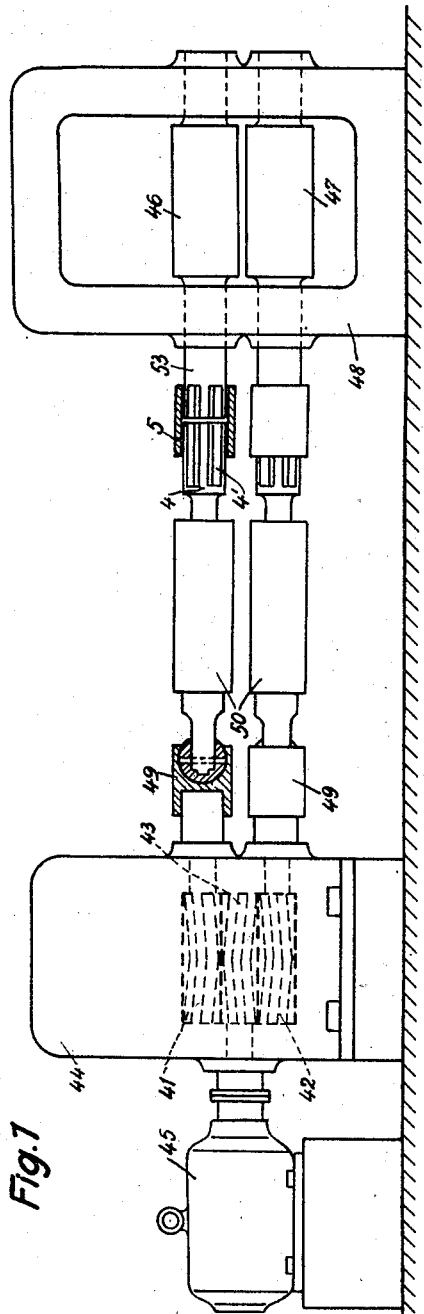
Fig. 1 is a diagrammatic view showing by way of example the arrangement of my novel coupling in a roller mill.

Referring now to the drawings in greater detail, and first to Fig. 1, it will be seen that two toothed rollers 41 and 42 in a gear roller frame 44 are driven from an intermediate toothed roller 43 which is connected to a driving motor 45. The torque is transmitted from the said gear rollers 41 and 42 to working rollers 46 and 47 in a working roller frame 48, through universal joints 49, elastic couplings 50 which will be hereinafter described, and joints or couplings comprising each a slidable sleeve 5 which surrounds the shaft ends, such as, 4 and 53 and wooden keys 4' engaged in longitudinal grooves of the shaft ends and of the sleeve. The ball or universal joints 49 serves to compensate variable heights of the working rollers 46 and 47 which, of course, are exchangeable to permit the production of different profiles, and the couplings 5 serve to permit easy exchange of the working rollers. In roller mills, elastic couplings are hitherto usually provided between the driving motor 45 and the gear rollers (41 and 42), but we have found that it is more favourable to arrange an elastic coupling (50) between the gear rollers and the working rollers, as shown in Fig. 1, because the jerks and shocks are mostly produced from the driven side, i. e., the working rollers, so that, in order to protect the gear system 41, 42, 43, 44 against detrimental jerks, it is required to provide an elastic coupling in the manner as shown in the drawings.

It will be understood that the arrangement illustrated in Fig. 1 is shown by way of example only and that our novel coupling may be arranged on other points, if desired. Also, more than two working rollers may be provided in the working roller frame 48 and further working roller frames may be connected to the same gear roller frame 44, if desired, such arrangements being known per se. In this case, our novel coupling is advantageously provided between any pair of spindles which are to be connected.

Some embodiments of our novel elastic coupling will now be described in greater detail with reference to the further figures in which it is assumed that the driving side, i. e., the gear rollers (41, 42, 43), is on the left hand side of the coupling while the working rollers are on the right hand side thereof, as indicated in Fig. 1.

Referring first to Fig. 2, it will be seen that an end portion 1 of the driving spindle embraces a ball shaped end portion 2 of the first or driving coupling member 3, by intermediation of a member 2a, thus making up the universal joint 49 shown in Fig. 1. The torque is transmitted through a cross pin 2b. On the opposite end of the coupling, the end portion 4 of the second or driven coupling member 6, 7 is connected to one of the working rollers, through a connection 4, 5, as hereinbefore described. A notch 9 between the portions 4 and 6, 7 serves to cause breakage in the member 4, 6, 7 in the case of overstress.

The central projection 7 of the coupling member 4, 6, 7 is engaged by a hub portion 8 of the coupling member 3. A coiled helical spring 10 consisting of a strip of rectangular cross section which is wound up in the form of a helice is provided within collars 3' and 6' of the two coupling members 3 and 6. The coupling members 3 and 6 may consist of normal cast steel while the pressure and frictional forces are taken up by wear-resistant slotted or unslotted sleeves 11a and 11b seated in the said collars of the coupling members. Advantageously, a plurality of rings 12 are provided between the end faces of the sleeves 11a and 11b, the inner diameters of which rings correspond to the inner diameters of the sleeves 11a and 11b, so as to tightly engage the helical spring 10. A casing 14 surrounds the parts of the coupling and serves to hold the same together by an inner flange portion 14' at one end and a threaded ring 15 screwed into its opposite end.

The opposite ends of the spring strips 10 are connected to the coupling members 3 and 6, 7, by pins 13a and 13b, respectively, and the helice of the spring is so directed that the same is tangentially compressed by action of a driving torque acting in the normal direction of rotation provided for the system, the said torque being transmitted from the coupling member 3 to the coupling member 6 by the pins 13a and 13b and by the frictional engagement of the outer surface of the spring 10 with the rings 11a and 11b which becomes tighter with increasing torque due to the tendency of the spring to grow in diameter.

The resilient effect of the coupling corresponds to the amount of tangential compression of the spring. If the rings 12 are sufficiently strong, pure compressive stresses will be produced in the spring strip 10 whereby the material of the spring, such as steel, is enabled to accumulate resiliently a very large amount of energy. By the rings 12 the amount of friction resulting by compression and releasing of the helical spring 10 and the tangential springing effect are controlled.

Referring now to Figs. 3, 4 and 5, it will first be noted that there is in this case provided a separate member 6a which is positively connected with a driven coupling member 4a, 7a by axial projections and grooves of the members 7a and 6a, as best seen from Fig. 5. Moreover, a bipartite spring or retaining ring 16, 16a is provided in the notch 9 of the coupling member 7a. Thus, in the case of an oblique breakage occurring on any point of the spindle 4a other than the notch 9 or in the roller the connecting screws 16b of the spring ring 16, 16a will break, whereby the spindle 4a and the member 7a are permitted to slide into the interior of the coupling, thus disengaging the torque transmitting member 6a and preventing destruction of the helical springs 10 and 17 of the coupling.

The spring 10 is arranged and connected in the same manner as the spring 10 in Fig. 1, except that the sleeves 11a and 11b are omitted. The second spring 17 is arranged to surround the rings 12 and the collars of the coupling members 3 and 6a, concentrically to the first spring 10, and is wound in the same direction as the spring 10. Connecting pins as indicated at 17a permit the transmission of tensile stresses from the coupling members 3 and 6a to the spring strip 17 in the case of a torque to be transmitted in a direction of rotation opposite to that transmitted by compressive stress of the spring strip 10. Such a torque tends to wind up the spring 17, against action of the rings 12, whereby the spring 17 is subjected to tensile stress and, additionally, to bending stress.

The efficiency of the coupling shown in Fig. 3 may be augmented by providing the rings 12 in such a manner with respect to the spring 17 that the rings 12 are compressed tangentially under the winding-up action of the spring 17, so that the ability of the rings of accumulating energy is also utilized. The radial thickness of the outer helical spring 17 should exceed the thickness of the intermediate rings 12 and the latter in turn should exceed the thickness of the inner helical spring 10, in order that the latter may be prevented from causing expansion of the rings 12, and to ensure that the spring 10 receives substantially tangential compressive stress only.

It is also contemplated within the purview of our invention to provide a single helical spring for the transmission of torque in either direction of rotation. An arrangement of this kind is illustrated in Fig. 6 in which the spring 10 is engaged between outer and inner collars 3a' and 3a'' of a coupling member 3a and between outer and inner collars 6b' and 6b'' of a coupling member 6b, and between corresponding outer and inner rings 12' and 12''. The ends of the helical spring are connected to the coupling members 3a and 6b, respectively, by means of pins 13a and 13b which are adapted to transmit compressive and tensile stresses from the coupling members to the spring strip. The spring 10 thus tends to be unwound in case of one direction of rotation, against action of the outer rings 12' and to be wound up in case of the opposite direction of rotation, against action of the inner rings 12''. The inner rings 12'' are so dimensioned that a certain tangential compression of the same is permitted under the contracting action of the spring, whereby the spring is exposed to tensile and bending stress. The outer rings 12' on the other hand are advantageously made thicker than the spring strip 10 to prevent expansion.

Figure 7:
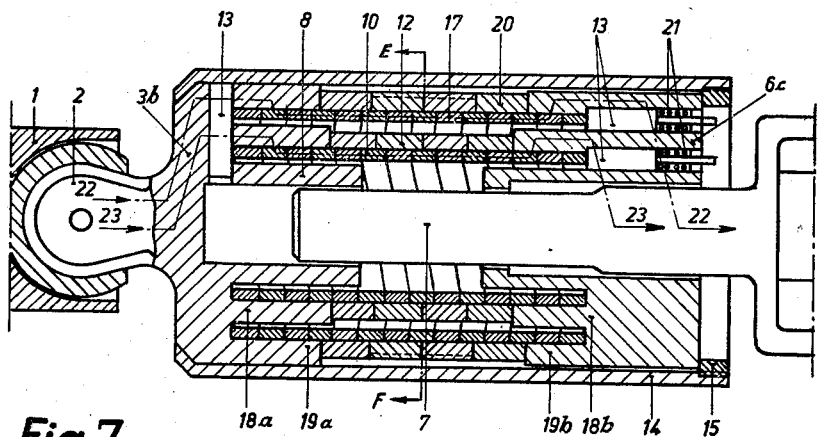

A further modification of a coupling for the transmission of torque in both directions of rotation is shown in Fig. 7. In this case, coupling members 3b and 6c are provided with two concentric collars 18a, 19a or 18b, 19b, respectively, between which two helical springs 10 and 17 are concentrically arranged which, however, are wound in opposite directions. The inner spring 10 is surrounded by closed rings 12 and the outer spring 17 is surrounded by rings 20 which rings 12 and 20 prevent expansion of the springs under action of a torque tending to unwind the spring 10 or 20, respectively, thus ensuring pure compressive stress of the springs.

The torque is transmitted to the helical springs 10 and 17 by frictional engagement of the springs with the collars 18a and 19a of the member 3b and pins 13 and from the helical springs to the member 6c by means of pins 13' and 13" which are acted upon by springs 21. The operation of the pins 13' and 13" and springs 21 will be best understood by reference to Figs. 8 and 9. As shown in these figures, the end of the helical spring 10 engages the pin 13', thus transmitting the torque to the member 6c, while the end turn of the helical spring 17 has depressed its pin 13", against action of the respective spring 21, so that no torque is transmitted from this spring. The reverse position is taken up by the parts in case of the opposite direction of rotation, so that the torque is transmitted from the spring 17 to the member 6c.

Figure 8:
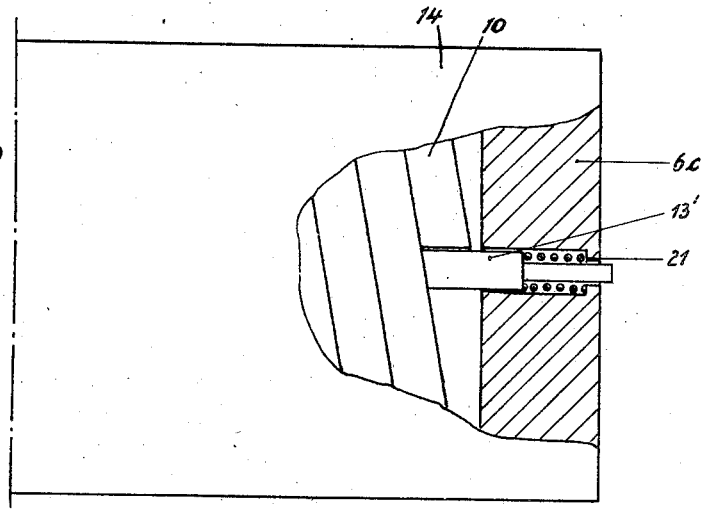
Figure 9:
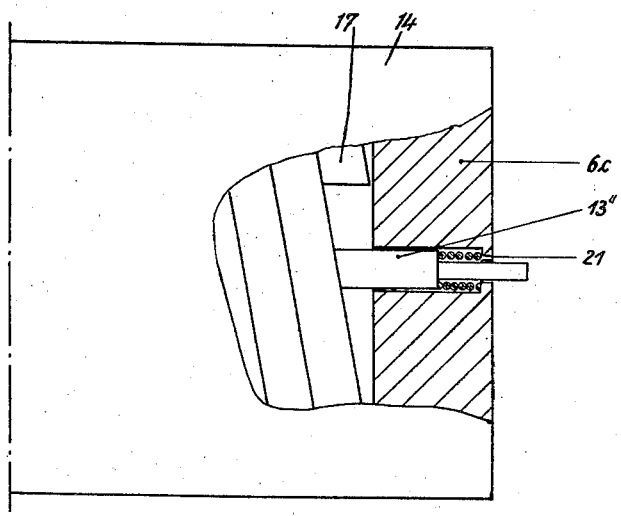

It will thus be clear from Figs. 7, 8 and 9, that in case of one direction of rotation the torque is transmitted from the member 2 through the member 3b, the annular projection or collar 19a, the helical spring 17, the coupling pin 13" and the member 6c to the shaft 4 (which is connected to the member 6 in the manner illustrated, for instance, in Figs. 3 and 5) as indicated by the dot and dash line 22 indicating the flux of the force, while in the case of the opposite direction of rotation the torque is transmitted from the member 2 through the member 3b, the collar 18a of the member 3b, the helical spring 10, the coupling pin 13' and the member 6c to the shaft 4, this being indicated by the dot and dash line 23 in Fig. 7.

Figure 11:
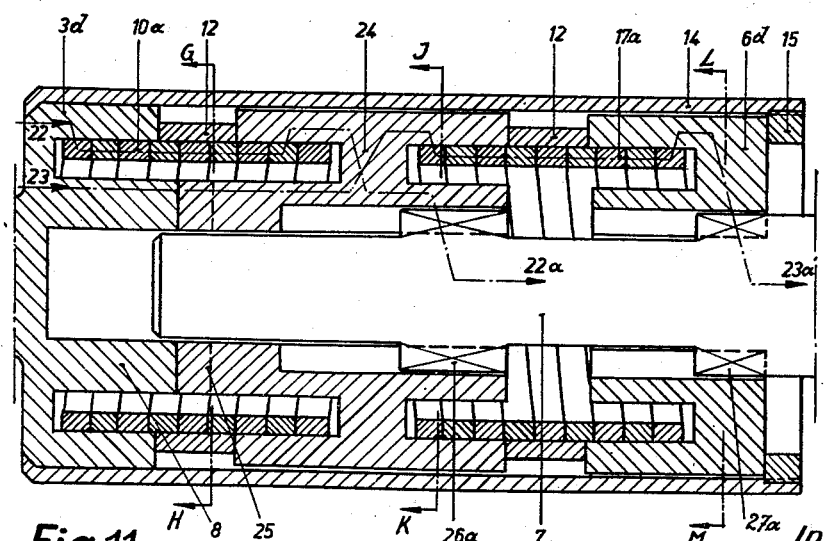
Figure 10:
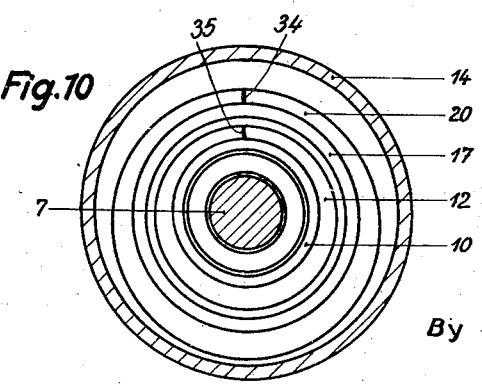

By way of alternative, the rings 12 and 20 in Fig. 7, or the corresponding rings in the other embodiments may be made of such thickness as to permit a certain radial expansion of the helical springs exposed to compressive stress, whereby additional bending moments are produced in the helical springs. To this end, the radial thickness of the rings 12 and 20 may be reduced as indicated by the dotted lines in Fig. 7. Also, the rings 12 or 20 may be slotted to this end, in the manner as indicated at 34 and 35 in Fig. 10. Advantageously each ring is reduced in thickness towards the slot, as shown in Fig. 10, to engage the inner helical spring with uniform pressure over the whole circumference.

Where it is intended to provide a longer coupling of smaller diameter for the transmission of forces in both directions, two helical springs may be arranged one behind the other in axial alignment, such an arrangement being shown in Fig. 11 in connection with Figs. 12 to 14. In this case, springs 10a and 17a are provided to act substantially in the manner described with reference to spring 10 of Fig. 2, but an intermediate member 24 has been inserted between the end members 3d and 6d for the purpose which will be described. The intermediate member 24 is provided with annular recesses for frictional engagement of the outer surfaces of the springs 10a and 17a. One or more rings 12 are provided between the collars of the members 3d and 6d and the member 24. Moreover, said member 24 is slidably mounted on the coupling member 7 and formed with coupling claws 25 and 26 engaging counterclaws 25a of the hub 8 and counterclaws 26a on the intermediate shaft 7, respectively, depending on the direction of rotation. Moreover, claws 27 of the coupling member 6d engage claws 27a on the shaft end 7. As shown in Fig. 12, in the case of a torque in the direction indicated by the arrow 22, the claws 25a on the hub 8 do not engage the claws 25 of member 24 so that no forces are transmitted through these claws 25, 25a in the case of rotation in the direction 22, while in case of a rotation in the direction indicated by the arrow 23 the claws 25a of the hub 8 will engage the claws 25 of member 24 and transmit the torque upon the same.

According to Fig. 13, the claws 26 engage the claws 26a of the coupling member 7 in the case of a rotation in the direction of arrow 22 while in the case of a rotation in the direction of arrow 23 no engagement and torque transmission would take place at this point. The tangential play between the claws 26 and 26a must be made so large that it exceeds the maximum possible relative motion of the parts due to the springing action of the helical spring in a tangential direction.

The claws 27 and 27a of the members 7 and 6d engage each other without play, as shown in Fig. 14. In the case of a direction of rotation according to the arrow 22 no force is transmitted through these claws, since the force is already transmitted to the shaft 7 through the claws 26, 26a. The coupling member 6 rotates idly in this case. In case of a rotation in the direction 23 the forces are transmitted from the coupling member 6 to the shaft 7 through the coupling claws 27 of Fig. 14.

It will thus be clear that the torque is transmitted in the manner indicated by the dot and dash line 22a, Fig. 11, through the spring 10a, in case of rotation of the coupling in the direction of arrow 22, Figs. 12 to 14, and in the manner indicated by the dot and dash line 23a, Fig. 11, through the spring 17a, in case of rotation of the coupling in the direction of the arrow 23, Figs. 11 to 13.

It will be clear from the foregoing that our novel coupling when arranged in the manner shown in Fig. 1 renders it possible to protect the gear rollers against the jerks exerted by the working rollers. Each roller which is separately driven is connected through a separate elastic coupling so that the spring can be adapted to the forces occurring at the respective point. Moreover, our novel coupling due to its tangentially stressed spring member can be made with a small diameter so that it can be accommodated in the space which is available and which depends directly on the diameter of the rollers. Due to the purely tangential stress of the spring considerable torques can be transmitted on a small space and the jerks which occur are absorbed by the property of our coupling of consuming frictional energy both in the stressing and releasing stroke.

The apparatus of the present invention has been described in detail with reference to specific embodiments. It is to be understood, however, that the invention is not limited by such specific reference but is broader in scope and capable of other embodiments than those specifically described and illustrated in the drawings. Also, our novel coupling may be used on points of roller mills other than those illustrated and above referred to or wherever it is intended to transmit torques resiliently between shafts or spindles.

We claim:

1. A coupling of relatively small diameter for two coaxial shafts, comprising a helically wound spring of constant diameter disposed coaxially with said shafts, sleeve-like means tightly encircling one end of said helical spring and adapted to transmit pressure torque from the driving shaft to said first end of the helical spring in a substantially tangential direction, sleeve-like means tightly encircling the other end of the spring and adapted to transmit the torque from said other end of said helical spring in a substantially tangential direction to the driven shaft, and at least one closed ring tightly encircling the free portion of said spring between said two torque transmitting means.

2. A coupling of relatively small diameter for two coaxial shafts, comprising a helically wound spring of constant diameter disposed coaxially with said shafts, sleeve-like means tightly encircling one end of said helical spring and adapted to transmit pressure torque from the driving shaft to said first end of the helical spring in a substantially tangential direction, sleeve-like means tightly encircling the other end of the spring and adapted to transmit the torque from said other end of said helical spring in a substantially tangential direction to the driven shaft, and at least one closed resilient ring tightly encircling the free portion of said spring between said two torque transmitting means and adapted to prevent said spring from materially changing its diameter.

3. A coupling of relatively small diameter for two coaxial shafts, comprising a first helically wound spring of constant diameter disposed coaxially with said shafts, sleeve-like means tightly encircling one end of said helical spring and adapted to transmit pressure torque from the driving shaft to said first end of the helical spring in a substantially tangential direction, sleeve-like means tightly encircling the other end of the spring and adapted to transmit the torque from said other end of said helical spring in a substantially tangential direction to the driven shaft, at least one closed resilient ring tightly encircling the free portion of said spring between said two torque transmitting means and adapted to prevent said spring from materially changing its diameter, a second helical spring of constant diameter coaxial with and wound in the same direction as said first helical spring, said second spring tightly encircling said sleeve-like torque transmitting means and said resilient ring, said sleeve-like torque transmitting means being adapted to transmit tension torque from the driving shaft to one end of said second spring in a substantially tangential direction opposite to the direction of the torque transmitted to said first spring, and to transmit the torque from the other end of said second spring in a substantially tangential direction to the driven shaft, respectively.

4. A coupling of relatively small diameter for two coaxial shafts, comprising a first helically wound spring of constant diameter disposed coaxially with said shafts, sleeve-like means tightly encircling one end of said spring and adapted to transmit pressure torque from the driving shaft to said first end of said helical spring in a substantially tangential direction, sleeve-like means tightly encircling the other end of the helical spring and adapted to transmit the torque from said other end of said helical spring in a substantially tangential direction to the driven shaft, at least one closed resilient ring tightly encircling the free portion of said spring between said torque transmitting means, the thickness of the ring wall exceeding that of the spring material, a second helically wound spring of constant diameter coaxial with and wound in the same direction as said first spring and tightly encircling said sleeve-like torque transmitting means and said ring, the thickness of the material forming said second spring exceeding that of the ring wall, said torque transmitting means adapted to transmit tension torque from the driving shaft to one end of said second spring in a substantially tangential direction opposite to the direction of the torque transmitted to said first spring, and to transmit the torque from the other end of said second spring in a substantially tangential direction to the driven shaft, respectively.

5. Resilient coupling between the shaft of the driving roller and the shaft of the driven roller of a roller mill, comprising a sleeve-like coupling member on the shaft of the driving roller, a sleeve-like coupling member on the shaft of the driven roller, a helically wound spring of constant diameter extending coaxially with said shafts and having its ends disposed in the said two coupling members, respectively, and at least one closed resilient ring tightly encircling the free portion of said spring and adapted to prevent the spring from materially changing its diameter, said sleeve-like coupling members accommodating the respective ends of the spring and being adapted to transmit pressure torque from the shaft of the driving roller to one end of the spring and torque from the other end of the spring to the shaft of the driven roller, respectively, in a substantially tangential direction.

6. Resilient coupling between the shaft of the driving roller and the shaft of the driven roller of a roller mill, comprising a sleeve-like coupling member on the shaft of the driving roller, a sleeve-like coupling member on the shaft of the driven roller, a helically wound spring of constant diameter extending coaxially with said shafts and having its ends disposed in the said two coupling members, respectively, and at least one closed resilient ring tightly encircling the free portion of said spring and adapted to prevent the spring from materially changing its diameter, said sleeve-like coupling members accommodating the respective ends of the spring and being adapted to transmit pressure torque from the shaft of the driving roller to one end of the spring and torque from the other end of the spring to the shaft of the driven roller, respectively, in a substantially tangential direction.

7. A coupling of relatively small diameter for two coaxial shafts, comprising two oppositely wound helical springs of the same constant diameter disposed coaxially with said shafts and in axial alignment with one another, sleeve-like means tightly encircling the outer end of one of said springs and adapted to transmit pressure torque in one direction from the driving shaft to said outer end of said first helical spring in a substantially tangential direction, sleeve-like means tightly encircling the inner end of this spring and adapted to transmit said torque from said inner end of this first helical spring in a substantially tangential direction to the driven shaft, at least one closed resilient ring tightly encircling the free portion of this spring between said two torque transmitting means, sleeve-like means encircling the inner end of said second helical spring and adapted to transmit pressure torque from the driving shaft to said inner end of said second spring in a substantially tangential direction opposite to the direction of the torque transmitted to said first spring, sleeve-like means encircling the outer end of said second helical spring and adapted to transmit the torque from this outer end of said second spring in a substantially tangential direction to the driven shaft, and at least one closed resilient ring tightly encircling the free portion of said second helical spring between the said sleeve-like transmitting means encircling the ends of this second spring.

8. A coupling, as claimed in claim 7, including a coupling member interposed between said two springs and being integral with the two sleeve-like means encircling the inner ends of said two springs, respectively.

9. A coupling, as claimed in claim 7, including a coupling member interposed between said two springs and being integral with the two sleeve-like means encircling the inner ends of said two springs, respectively, rigid means to transmit torque in one direction only from the driving shaft to said coupling member and rigid means to transmit torque in the opposite direction only from said coupling member to the driven shaft, whereby the torque in either direction is transmitted from the driving shaft to the driven shaft through the associated spring.

ERNST KREISSIG.
FRANZ TÖNNE.
KURT ROSENBAUM.